US010851282B2

(12) United States Patent
Janak et al.

(10) Patent No.: US 10,851,282 B2
(45) Date of Patent: Dec. 1, 2020

(54) FOAMING AGENT COMPOSITION AND METHOD FOR REMOVING HYDROCARBON LIQUIDS FROM SUBTERRANEAN WELLS

(71) Applicant: Lonza Ltd., Visp (CH)

(72) Inventors: Kevin Janak, Ossining, NY (US); Steven Colby, Atlanta, GA (US)

(73) Assignee: Lonza Solutions AG, Visp (CH)

( * ) Notice: Subject to any disclaimer, the term of this patent is extended or adjusted under 35 U.S.C. 154(b) by 0 days.

(21) Appl. No.: 15/838,464

(22) Filed: Dec. 12, 2017

(65) Prior Publication Data

US 2018/0163118 A1 Jun. 14, 2018

Related U.S. Application Data

(60) Provisional application No. 62/432,894, filed on Dec. 12, 2016.

(30) Foreign Application Priority Data

Mar. 21, 2017 (EP) .................................... 17161961

(51) Int. Cl.
| | |
|---|---|
| *E21B 43/34* | (2006.01) |
| *C09K 8/38* | (2006.01) |
| *C09K 8/58* | (2006.01) |
| *C09K 8/70* | (2006.01) |
| *E21B 43/16* | (2006.01) |
| *C07F 7/08* | (2006.01) |
| *E21B 43/12* | (2006.01) |
| *C09K 8/594* | (2006.01) |
| *C09K 8/86* | (2006.01) |
| *C09K 8/94* | (2006.01) |
| *C09K 8/035* | (2006.01) |

(52) U.S. Cl.
CPC .............. *C09K 8/38* (2013.01); *C07F 7/0834* (2013.01); *C09K 8/035* (2013.01); *C09K 8/58* (2013.01); *C09K 8/594* (2013.01); *C09K 8/703* (2013.01); *C09K 8/86* (2013.01); *C09K 8/94* (2013.01); *E21B 43/122* (2013.01); *E21B 43/16* (2013.01); *E21B 43/34* (2013.01); *C09K 2208/20* (2013.01); *C09K 2208/22* (2013.01); *C09K 2208/28* (2013.01); *C09K 2208/32* (2013.01)

(58) Field of Classification Search
CPC . C09K 8/38; C09K 8/035; C09K 8/58; C09K 8/594; C09K 8/703; C09K 8/94; C09K 8/86; C09K 2208/20; C09K 2208/28; C09K 2208/32; E21B 43/16; E21B 43/34
See application file for complete search history.

(56) References Cited

U.S. PATENT DOCUMENTS

| | | | |
|---|---|---|---|
| 3,259,468 A | 8/1966 | Phansalkar et al. | |
| 4,680,127 A * | 7/1987 | Edmondson | ........... B01D 53/52 |
| | | | 210/749 |
| 4,992,182 A | 2/1991 | Kalfayan et al. | |
| 5,145,596 A | 9/1992 | Blank et al. | |
| 6,994,890 B2 | 2/2006 | Ohlhausen et al. | |
| 7,632,797 B2 | 12/2009 | Moses et al. | |
| 8,950,494 B2 | 2/2015 | Nguyen et al. | |
| 2007/0039732 A1 * | 2/2007 | Dawson | ............... C09K 8/5083 |
| | | | 166/270 |
| 2007/0079963 A1 | 4/2007 | Yang et al. | |
| 2009/0074971 A1 | 3/2009 | McMahon et al. | |
| 2010/0267593 A1 * | 10/2010 | Zhang | ..................... C09K 8/575 |
| | | | 507/219 |
| 2012/0279715 A1 | 11/2012 | Nguyen et al. | |
| 2012/0285693 A1 * | 11/2012 | Mirakyan | ............... C09K 8/605 |
| | | | 166/308.1 |
| 2013/0081812 A1 * | 4/2013 | Green | ..................... C09K 8/805 |
| | | | 166/280.1 |
| 2013/0276668 A1 | 10/2013 | Ranka et al. | |
| 2014/0212333 A1 | 7/2014 | Peterson, II et al. | |
| 2015/0322757 A1 | 11/2015 | Hatchman et al. | |
| 2016/0200965 A1 | 7/2016 | Farion et al. | |
| 2016/0257879 A1 | 9/2016 | Huang et al. | |

FOREIGN PATENT DOCUMENTS

WO    WO 2014/149524    9/2014

OTHER PUBLICATIONS

PCT/US2017/065740 International Search Report and Written Opinion dated Mar. 23, 2018, 11 pages.
EP Application No. 17161961.2-1354 Search Report, dated Jul. 20, 2017.
Kuraoka K et al: "Hydrocarbon separation via porous glass membranes surface-modified using organosilane compounds", Journal of Membrane SCI, Elseviier BV, NL, vol. 182, No. 1-2, Feb. 15, 2001, pp. 139-149.
Koczo, et al., SPE141471, Silicon-based Foamants for Foam Assisted Lift of Aqueous-Hydrocarbon Mixtures Paper presented Apr. 11-13, 2011, pp. 1-11.

* cited by examiner

*Primary Examiner* — Silvana C Runyan
(74) *Attorney, Agent, or Firm* — Dority & Manning, PA

(57) ABSTRACT

A composition containing a quaternary organosilane foaming agent capable of foaming various liquids in order to remove the liquids from subterranean wells is described. For instance, the composition can be used to remove hydrocarbon condensate liquids from a gas well or an oil well. Of particular advantage, the composition can foam liquids containing substantial amounts of hydrocarbons.

19 Claims, No Drawings

FOAMING AGENT COMPOSITION AND METHOD FOR REMOVING HYDROCARBON LIQUIDS FROM SUBTERRANEAN WELLS

RELATED APPLICATIONS

The present application is based on and claims priority to U.S. Provisional Patent application Ser. No. 62/432,894 filed on Dec. 12, 2016, and claims priority to European Patent application No. 17161961.2 filed on Mar. 21, 2017, which are both incorporated herein by reference.

BACKGROUND

In order to harvest and collect natural gas, in one embodiment, a bore is formed into the surface above a natural gas reserve. When first completed, many natural gas wells have sufficient reservoir pressure for flow to be established from the reservoir to the surface. A typical problem of gas wells, however, is that they often produce and accumulate liquids. The liquids may comprise water or aqueous solutions and/or hydrocarbon compounds, known as hydrocarbon condensates. As gas production continues, the liquids have a tendency to accumulate within the well. As the liquids accumulate the reservoir pressure declines and as pressure declines, the velocity of the gases in the well decreases. Eventually, the accumulated liquids can render the well uneconomical and/or even stop production of the gas products. For example, as the bottom well pressure approaches reservoir shut-end pressure, gas flow stops and all liquid accumulates at the bottom of the tubing that makes up the well.

Liquids such as hydrocarbon condensates can also build up and cause problems in oil wells. The hydrocarbon liquids, for instance, can create problems in the wells especially when the well also contains natural gas or other hydrocarbon gases that are being vented and/or collected.

One common approach to temporarily restoring flow is to vent the well to the atmosphere, which is known as well "blow down." Venting the well to the atmosphere, however, can result in a significant amount of loss of the gas products being collected.

In view of the above, those skilled in the art have attempted to devise different ways in order to remove the liquid that accumulates within the natural gas and oil wells. For instance, artificial lift methods that have been proposed in the past in order to deliquify gas wells include pumping the liquids using a suitable pumping device. For instance, those skilled in the art have attempted to remove the liquids through cavity pumping, submersible pumping, and hydraulic pumping. The use of pumps, however, has many limitations. For instance, pumps have limited head capacity. In addition, pumps cannot withstand many of the high temperatures experienced within the wells. The use of pumps also represents a significant capital cost and manpower requirement, and can complicate the process.

Another method used in the past in order to remove liquids within wells is to use plungers, such as tubing plungers or casing plungers. The use of plungers, however, typically requires gas production to stop while sufficient pressure builds to lift the plunger to the surface of the well.

Those skilled in the art have also proposed placing soap sticks or other foaming agents into a well that causes the liquid portion to foam. The soap sticks, for instance, can include a foaming agent such as an alkyl benzene sulfonate, an alcohol ether sulfonate, alkylnapthalene sulfonate, alkyldiphenyloxide disulfonate, and the like. Other foaming agents that have been proposed for use in the past include alkyl quaternary ammonium chlorides, dialkyl quaternary ammonium chlorides, alkyl amido betaines, and alkyl imidazolines. In still another embodiment, those skilled in the art have proposed using siloxane polymers as foaming agents to remove liquids, primarily aqueous liquids from gas and oil wells. Causing the unwanted liquids to foam, for instance, greatly reduces the amount of pressure needed in order to bring the liquid components to the surface. Thus, by foaming the liquid, reservoir pressure can be used to remove the liquid.

Problems have been experienced in using foaming agents, however. For instance, the above foaming agents are capable of foaming water and aqueous solutions but are not capable of sufficiently foaming hydrocarbons. Thus, the foaming agents are only successful when the liquid in the well is comprised of primarily water.

In view of the above, a need currently exists for a process and method for removing liquids from a well, particularly natural gas and oil wells. For instance, a need exists for a foaming composition or foaming agent composition capable of foaming hydrocarbon liquids, such as hydrocarbon condensates.

SUMMARY

In general, the present disclosure is directed to a foaming or foamable composition capable of foaming liquids containing substantial amounts of hydrocarbons, such as hydrocarbon condensates. The composition is particularly well suited for use in a method for removing liquids from a tubular structure, such as subterranean wells. The tubular structure, for instance, may be comprised of or attached to a gas or oil well, a well bore, or a pipeline. The composition is capable of foaming a liquid that contains one or more hydrocarbons in an amount greater than about 40% by weight, such as greater than 50% by weight, such as greater than 60% by weight. The composition, in fact, is capable of foaming a liquid comprised of only hydrocarbons. In accordance with the present disclosure, the composition contains a quaternary organosilane foaming agent.

For example, in one embodiment, the present disclosure is directed to a method for removing a liquid from a tubular structure which includes a step of adding a composition to a liquid contained in the tubular structure. The composition comprises a foaming agent, and particularly a quaternary organosilane. After the composition is added to the liquid, a foamed liquid is formed within the tubular structure. More particularly, the composition is combined with the liquid in a manner that causes the liquid to form a foam, such as through agitation. The liquid can primarily comprise hydrocarbons alone or in combination with other liquids such as water. Once formed into a foam, the foamed liquid is brought to the surface of the tubular structure such as the gas or oil well. At the surface, the foam dissipates and the resulting liquid, which may also be combined with gases, can be fed to a separator. The separator can comprise a pressure vessel for separating the entering fluid into gaseous and liquid components. The liquid components can be further separated into a hydrocarbon component and a water component.

In one embodiment, the tubular structure comprises a gas or oil well that includes a pressurized gas. The reservoir gas pressure within the tubular structure not only assists in forming the foam but also can be used to remove the foamed liquid from the tubular structure after the foam is formed.

In one embodiment the quaternary organosilane can have the following formula (I):

$$Y^1Y^2Y^3\text{Si-A-Q}^+R^1R^2R^3X^- \qquad (I)$$

wherein:

$Y^1$, $Y^2$, $Y^3$ represent independently from each other R or RO wherein each R represents independently from each other a $C_{1-4}$ alkyl group;

A represents a $C_{1-4}$ alkanediyl or a $C_{2-4}$ alkenediyl group

Q represents a nitrogen or phosphorous atom;

$R^1$, $R^2$ and $R^3$ represent independently from each other a $C_{1-28}$ alkyl group wherein at least one alkyl group has at least eight carbon atoms; and X represents chloride, bromide, fluoride, iodide, acetate or tosylate.

In a preferred embodiment, the quaternary organosilane can have the following formula (II):

$$(RO)_3\text{Si-A-Q}^+R^1R^2R^3X^- \qquad (II)$$

wherein each R represents independently from each other a $C_{1-4}$ alkyl group;

A represents a $C_{1-4}$ alkanediyl or a $C_{2-4}$ alkenediyl group

Q represents a nitrogen or phosphorous atom;

$R^1$, $R^2$ and $R^3$ represent independently from each other a $C_{1-28}$ alkyl group wherein at least one alkyl group has at least eight carbon atoms; and $X^-$ represents chloride, bromide, fluoride, iodide, acetate or tosylate.

Preferably the quaternary organosilane comprises a halide salt of a quaternary ammonium silane. More preferably the quaternary organosilane is 3-(trimethoxysilyl) propyldimethyloctadecyl ammonium chloride.

As shown above, silanes that may be used according to the present disclosure, in one embodiment, only contain a single silicon atom in the molecule and thus exclude siloxanes. The non-polymeric silane compounds can generally have a molecular weight of less than about 900, such as less than about 800, such as less than about 700, such as less than about 600. The molecular weight of the silane molecule is generally greater than about 50, such as greater than about 100.

In one embodiment, in addition to the quaternary organosilane foaming agent, the composition can contain a solvent, preferably a non-aqueous solvent. When containing a non-aqueous solvent, the composition can have a low water content prior to contact with the liquid in the tubular structure. For example, water can be contained in the composition in an amount less than about 5% by weight, more preferably less than about 2% by weight, most preferably in an amount less than about 1% by weight.

In general, any suitable non-aqueous solvent can be combined with the quaternary organosilane as long as the solvent does not interfere with the foaming properties of the quaternary organosilane and is compatible with the liquid in the tubular structure. For example, the non-aqueous solvent may be selected from a group comprising an alcohol, a benzene derivative, a ketone or an ester or from mixtures of two or more of the aforementioned.

In one embodiment, the composition contains the non-aqueous solvent in an amount from 25% to 75% by weight and contains the quaternary organosilane foaming agent in an amount of from 75% to 25% by weight. In one embodiment, the composition is added to the liquid in the tubular structure in an amount such that the concentration of the quaternary organosilane in the resulting mixture is from 250 ppm to 5000 ppm.

After the foamed liquid is removed from the tubular structure, the foamed liquid can be further processed as desired. In one embodiment, for instance, hydrocarbons contained in the foamed liquid can be separated and reused.

The present disclosure is also directed to a composition for removing liquids from gas and oil wells. The composition comprises a quaternary organosilane as described above. In one embodiment, the quaternary organosilane foaming agent as described above is combined with a non-aqueous solvent. The composition can further comprise one or more additives. For instance, the additives may comprise a corrosion inhibitor, a scale inhibitor, and/or a hydrogen sulfide scavenger. For instance, in one embodiment, the foaming agent composition contains a hydrogen sulfide scavenger that comprises glyoxal or 1,3-dimethylol-5,5-dimethylhydantion. In one embodiment, the non-aqueous solvent comprises naphtha or an aromatic petroleum distillate, such as a benzene derivative. For instance, the solvent may be selected from naphtha, xylene, or toluene or mixtures thereof.

Of particular advantage, the composition of the present disclosure is not only well suited to forming a foam with a liquid containing substantial amounts of one or more hydrocarbons, but also produces a foam that dissipates relatively quickly. In this manner, the composition is capable of quickly foaming a hydrocarbon liquid in order to remove the liquid from a tubular structure and also has a relatively short foam half-life allowing for easy handling of the recovered liquid and separation of the hydrocarbons from aqueous components after removal. For example, the composition of the present disclosure can have a foam half-life in kerosene of less than 180 seconds when the concentration of the quaternary organosilane in kerosene is 1000 ppm on a weight basis. For example, the foam can have a half-life of less than 120 seconds, such as less than 90 seconds, such as less than 60 seconds. When the concentration of the quaternary organosilane in kerosene is 1500 ppm on a weight basis, the composition can have a foam half-life in kerosene of less than about 240 seconds, such as less than about 180 seconds, such as less than about 120 seconds, such as less than about 100 seconds.

Other features and aspects of the present disclosure are discussed in greater detail below.

DETAILED DESCRIPTION

In this text the following meanings are used if not otherwise stated.

The term "halogen" or "halide" means F, Cl, Br or I or fluoride ($F^-$), chloride ($Cl^-$), bromide ($Br^-$), or iodide ($I^-$).

The term "alkyl" refers to linear or branched alkyl; preferably linear alkyl. The term alkane means a linear or branched alkane.

The term "alkanediyl" as used herein, refers to divalent saturated aliphatic group, with one or two saturated carbon atom(s) as the point(s) of attachment, a linear or branched, cyclo, cyclic or acyclic structure, no carbon-carbon double or triple bonds, and no atoms other than carbon and hydrogen. The groups, —$CH_2$— (methylene), —$CH_2CH_2$—, —$CH_2C(CH_3)_2CH_2$—, and —$CH_2CH_2CH_2$— are non-limiting examples of alkanediyl groups.

The term "alkenediyl" as used herein, refers to a divalent unsaturated aliphatic group, with two carbon atoms as points of attachment, a linear or branched, cyclo, cyclic or acyclic structure, at least one nonaromatic carbon-carbon double bond, no carbon-carbon triple bonds, and no atoms other than carbon and hydrogen. The groups, —CH=CH—, —CH=C(CH$_3$)CH$_2$—, —CH$_2$—CH=CH—CH$_2$—, —CH=CH—CH$_2$—CH$_2$—. and —CH=CHCH$_2$— are non-limiting examples of alkenediyl groups.

The term "alcohol" as used herein, refers to any of a class of organic compounds characterized by one or more hydroxyl (—OH) groups attached to a carbon atom of an alkyl group (hydrocarbon chain). The alcohol can be primary, secondary or tertiary.

In the following text "hydrocarbon" as used herein refers to an organic compound consisting entirely of hydrogen and carbon. Hydrocarbons may be aromatic hydrocarbons (arenes), alkanes, alkenes, cycloalkanes and alkyne-based compounds. Hydrocarbons may be saturated hydrocarbons (alkanes) composed entirely of single bonds and are saturated with hydrogen. The general formula for saturated hydrocarbons is $C_nH_{2n+2}$ (assuming noncyclic structures). Hydrocarbons may be unsaturated hydrocarbons having one or more double or triple bonds between carbon atoms such as alkenes and alkynes as defined above. Hydrocarbons may be cycloalkanes, which are hydrocarbons containing one or more carbon rings to which hydrogen atoms are attached. Hydrocarbons may be aromatic hydrocarbons, also known as arenes, are hydrocarbons that have at least one aromatic ring. Hydrocarbons may be a liquid hydrocarbon. The liquid hydrocarbon may be any type of liquid hydrocarbon including, but not limited to, crude oil, heavy oil, processed residual oil, bituminous oil, coker oils, coker gas oils, fluid catalytic cracker feeds, gas oil, naphtha, fluid catalytic cracking slurry, diesel fuel, fuel oil, jet fuel, gasoline, and kerosene.

The term "a mixture thereof" as used herein, refers to a mixture of two or more of the aforementioned compounds.

The term a "tubular structure" as used herein, refers to a pipe through which a gas or oil can be transported. The tubular structure, for example, can be a subterranean well. The tubular structure may be comprised of or attached to a gas or oil well, a well bore, or a pipeline.

The term "fluid" refers to a liquid, a gas, or mixtures thereof.

It is to be understood by one of ordinary skill in the art that the present discussion is a description of exemplary embodiments only, and is not intended as limiting the broader aspects of the present disclosure.

In general, the present disclosure is directed to a composition and to a method for removing hydrocarbon liquids from subterranean wells by foaming the hydrocarbon liquids within the well. For example, in one embodiment, the composition is particularly well suited for removing hydrocarbon liquids from gas and oil wells. In accordance with the present disclosure, the composition contains a quaternary organosilane foaming agent, such as a halide salt of a quaternary ammonium silane.

The composition of the present disclosure offers various benefits and advantages when attempting to remove hydrocarbon liquids from tubular structures through foam formation. For instance, the composition of the present disclosure is particularly well suited to foaming liquids containing substantial amounts of hydrocarbons, such as hydrocarbon condensates, that may accumulate in oil and gas wells. For instance, in the past, problems have been experienced in attempting to foam liquids in oil and gas wells when the liquids contain less than about 80% water. The composition of the present disclosure, on the other hand, can foam liquids containing less than 80% water, such as less than 60% water, such as less than 40% water, such as less than 20% water, such as less than 10% water by weight. For example, the composition of the present disclosure can foam liquids containing hydrocarbons in an amount greater than about 20%, such as in an amount greater than about 40%, such as in an amount greater than about 50%, such as in an amount greater than about 60%, such as in an amount greater than about 70%, such as in an amount greater than about 80%, such as even in amounts greater than about 90% by weight. The composition, in fact, can foam liquids that contain substantially no water (less than about 5% by weight, such as less than 2% by weight, such as less than about 1% by weight water,) and are made almost entirely from hydrocarbon liquids.

In addition to being capable of foaming hydrocarbon liquids, the composition of the present disclosure also rapidly produces foam, and, in turn, produces a foam that also rapidly dissipates. This provides various advantages and benefits when removing liquids from tubular structures, such as oil and gas wells. For instance, during the process, a foam rapidly develops that allows for liquids in the well to rise and be removed from the well. The composition also creates a foam that breaks at the well surface. By breaking at the surface, the liquid collected from the well can be easily handled and further processed. Dissipation of the foam, for instance, allows for easy separation of the components contained in the liquid. For instance, in one embodiment, any hydrocarbons contained in the liquid can be separated from the remainder of the liquid. For example, liquids removed from the well in accordance with the present disclosure can be fed to a separator that separates the liquids into a hydrocarbon component and an aqueous component.

The composition of the present disclosure may comprise a foaming agent, such as a quaternary organosilane, in combination with a solvent. Preferably the solvent is a non-aqueous solvent. The composition is particularly well suited for removing liquids from tubular structures, such as gas wells, oil wells, or a pipeline. In one embodiment, for instance, the composition can be used to remove liquids from a gas well, such as a natural gas well. In accordance with the present disclosure, the composition can be added to the well continuously or in a batch wise manner. In one embodiment, for instance, the composition can be continuously added to the well using a string or capillary extending into the well bore. Of particular advantage, the composition is well suited to withstanding the temperatures and pressures that may exist within a gas or oil well. When removing liquids from a well, the reservoir gas pressure within the well can be used to assist in forming a foam between the composition and a liquid contained in the well and can also be used as the pressure needed in order to remove the foamed liquid from the well.

In addition to gas wells, the composition of the present disclosure can also be used to remove liquids, such as hydrocarbon condensates, from oil wells. In some oil wells, sufficient reservoir gas pressure exists capable of not only facilitating foam formation but also sufficient to rise the foamed liquid to the top of the well. In other embodiments, however, artificial gas pressure can be introduced into the well for removing the foamed liquid. For instance, an inert gas, such as nitrogen, can be pumped into the well for facilitating foam formation and for providing sufficient pressure to bring the foamed liquid to the surface.

Quaternary organosilanes have been found to be particularly well suited for foaming liquids in accordance with the present disclosure. Quaternary organosilanes are unique due to the presence of a polar cationic nitrogen and a non-polar organic group, which makes them amphiphilic in nature. Their cationic nature makes them water soluble and/or dispersible, while the non-polar hydrocarbon component makes them easily soluble and/or dispersible in non-polar mixtures. Although unknown, it is believed that the amphiphilic behavior of the quaternary organosilane compounds helps stabilize a non-polar/polar interface such as a water condensate mixture, thereby making quaternary organosilanes excellent foam producers.

The quaternary organosilane composition, according to certain embodiments of the present disclosure, may comprise one or more quaternary organosilane compounds comprising at least one alkoxy group. Preferably, the at least one alkoxy group comprises ethylene glycol or polyethylene glycol functionality. The at least one alkoxy group can comprise ethylene glycol or polyethylene glycol functionality bonded to a silicon atom.

In certain embodiments, the one or more quaternary organosilane compounds can have the following formula (I):

$$Y^1Y^2Y^3Si-A-Q^+R^1R^2R^3X^+ \quad (I)$$

wherein:

$Y^1$, $Y^2$, $Y^3$ represent independently from each other R or RO wherein each R represents independently from each other a $C_{1-4}$ alkyl group;

A represents a $C_{1-4}$ alkanediyl or a $C_{2-4}$ alkenediyl group;

Q represents a nitrogen or phosphorous atom;

$R^1$, $R^2$ and $R^3$ represent independently from each other a $C_{1-28}$ alkyl group wherein at least one alkyl group has at least eight carbon atoms, $-CH_2C_6H_5$, $-CH_2CH_2OH$, $-CH_2OH$, and $-(CH_2)xNHC(O)R^6$ wherein x is an integer of two to ten and $R^6$ is a $C_{1-12}$-perfluoroalkyl group; and X represents chloride, bromide, fluoride, iodide, acetate or tosylate.

In one embodiment, the silanes are trialkoxysilyl compounds having the general formula (II)

$$(RO)_3Si-A-Q^+R^1R^2R^3X^- \quad (II)$$

wherein each R represents independently from each other a $C_{1-4}$ alkyl group;

A represents a $C_{1-4}$ alkanediyl or a $C_{2-4}$ alkenediyl group;

Q represents a nitrogen or phosphorous atom;

$R^1$, $R^2$ and $R^3$ represent independently from each other a $C_{1-28}$ alkyl group wherein at least one alkyl group has at least eight carbon atoms; and $X^-$ represents chloride, bromide, fluoride, iodide, acetate or tosylate.

Exemplary silanes for this disclosure are those silanes having the formula

$(CH_3O)_3Si(CH_2)_3N^{\oplus}(CH_3)_2C_{18}H_{37}Cl^-$ and $(CH_3O)_3Si(CH_2).N^{\oplus}C_{H3}(C_{10}H_{21})Cl^-$.

Specific silanes within the scope of the disclosure are represented by the following:

$(CH_3O)_3Si(CH_2)_3N^+(CH_3)_2C_{18}H_{37}Cl^-$, $(CH_3O)_3Si(CH_2)^3N^+(CH_3)_2C_{18}H_{37}Br^-$, $(CH_3O)_2Si(CH_2)_3N^+(C_{10}H_{21})CH_3Cl^-$, $(CH_3O)_3Si(CH_2)_3N^+(C_{10}H_{21})_2CH_3Br^-$, $(CH_3O)_3S(CH_2)_3N^+(CH_3)_3Cl^-$, $(CH_3O)_3SiCH_2CH_2CH_2P^+(C_6H_5)_3Cl^-$, $(CH_3O)_3SiCH_2CH_2CH_2P^+(C_6H_5)_3Br^-$, $(CH_3O)_3SiCH_2CH_2CH_2P^+(CH_3)_3Cl^-$, $(CH_3O)_3SiCH_2CH_2CH_2P^+(C_6H_{13})_3Cl^-$, $(CH_3)_3Si(CH_2)_3N^+(C_3)_2C_{12}H_{25}Cl^-$, $(CH_3)_3Si(CH_2)_3N^+(C_{10}H_{21})_2CH_3Cl^-$, $(CH_3)_3Si(CH_2)_3N^+(CH_3)_2C_{18}H_{37}Cl^-$, $(CH_3O)_3Si(CH_2)_3N^+(CH_3)_2C_4H_9Cl^-$, $(C_2H_5O)_3Si(CH_2)_3N^+(CH_3)_2C_{18}H_{37}Cl^-$, $(CH_3O)_3Si(CH_2)_3N^+(CH_3)_2CH_2C_6H_5Cl^-$, $(CH_3O)_3Si(CH_2)_3N^+(CH_3)_2CH_2CH_2OHCl^-$,

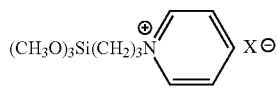

$(CH_3O)_3Si(CH_2)_3N^+(CH_3)_2(CH_2)_3NHC(O)(CF_2)_6CF_3Cl^-$, $(CH_3O)_3Si(CH_2)_3N^+(C_2H_5)_3Cl^-$.

In one embodiment, the organosilane quaternary ammonium compound for application in accordance with the method of the present disclosure is 3-(trimethoxysilyl) propyldimethyloctadecyl ammonium chloride of the formula

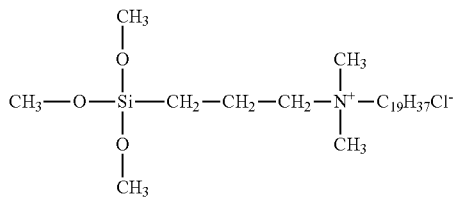

As shown above, 3-(trimethoxysilyl) propyldimethyloctadecyl ammonium chloride has an alkyl group attached to the nitrogen having a carbon chain length of 18 carbon atoms. In certain embodiments, this alkyl group can have a carbon chain length of at least 8 carbon atoms, such as at least 12 carbon atoms, such as at least 14 carbon atoms, such as at least 16 carbon atoms. The carbon chain length of this alkyl group can be generally less than about 28 carbon atoms, such as less than about 22 carbon atoms.

The foaming agent, such as the organosilane quaternary ammonium compound as described above, can be combined with a solvent to form the foaming agent composition in accordance with the present disclosure. Preferably the solvent is selected from a non-aqueous solvent. More preferably the solvent can comprise an organic solvent.

Suitable organic solvents should preferably not negatively impact the stability of the quaternary organosilane compounds. Suitable solvents are, but are not limited to, alcohols, naphtha, benzene derivatives, ketones or esters, or mixtures of two or more of the aforementioned. Preferably the organic solvents may include at least one alcohol.

Examples of alcohols that can be used according to the present invention are, but are not limited to methanol, ethanol, isopropanol and glycols. Examples of glycols and derivatives thereof that can be used are, but are not limited to, ethylene glycol, propylene glycol, ethylene glycol monoethyl ether, ethylene glycol monobutyl ether, ethylene glycol dibutyl ether, ethylene glycol monoethyl ether acetate, ethylene glycol monohexyl ether acetate, propylene glycol monoethyl ether, propylene glycol dibutyl ether; the mono- and dialkylethers of diethylene glycol such as diethylene glycol monoethyl ether, diethylene glycol dibutyl ether, diethylene glycol diethyl ether, and diethylene glycol monobutyl ether acetate.

In one embodiment, the solvent is selected from a group comprising naphtha or an aromatic petroleum distillate, or mixtures thereof. Preferably the solvent may comprise naphtha or benzene derivatives. Examples include, but are not limited to, naphtha, xylene, toluene or mixtures thereof.

Examples of ketones that can be used according to the present invention are, but are not limited to, acetone, acetophenone, butanone, cyclohexanone, ethyl isopropyl ketone, diacetone, isophorone, methyl isobutyl ketone, methyl isopropyl ketone, methylethyl ketone, methylamyl ketone, and 3-pentanone.

Examples of ester solvents that can be used according to the present invention are, but are not limited to, preferably esters and more preferably acetate esters. Preferably the solvent is selected from, but not limited to, benzyl benzoate, more preferably from butyl acetate, methyl acetate, ethyl acetate, n-propyl acetate, isobutyl acetate, isoamyl acetate, isopropyl acetate, n-butyl acetate, isobutyl acetate, amyl acetate, sec-butyl acetate, tert-butyl acetate, ethyl acetoacetate, ethylene glycol monomethyl ether acetate and ethylene glycol monoethyl ether acetate.

The solvent combined with the quaternary organosilane may also comprise a mixture of any of the solvents described above. In one embodiment, the solvent may comprise water. In one embodiment, however, the foamable composition is substantially free of water containing water in an amount less than about 5% by weight, such as in an amount less than about 2% by weight, such as in an amount less than about 1% by weight. In one embodiment, for instance, the foaming agent composition does not contain water and is water-free.

In one embodiment preferably, one or more solvents are contained in the composition of the present disclosure in an amount greater than about 25% by weight, such as in an amount greater than about 40% by weight, such as in an amount greater than about 50% by weight, such as in an amount greater than about 60% by weight, such as in an amount greater than about 70% by weight, such as in an amount greater than about 80% by weight, such as in an amount greater than about 90% by weight, such as in an amount greater than about 95% by weight. One or more solvents are preferably contained in the composition in an amount less than about 98% by weight, such as in an amount less than about 95% by weight, such as in an amount less than about 90% by weight, such as in an amount less than about 80% by weight, such as in an amount less than about 70% by weight, such as in an amount less than about 50% by weight.

Preferably the quaternary organosilane is present in the composition in an amount generally greater than about 2% by weight, such as in an amount greater than about 25% by weight, such as greater than about 35% by weight, such as greater than about 45% by weight, such as greater than about 55% by weight, such as greater than about 65% by weight, such as even greater than about 70% by weight. The quaternary organosilane is preferably present in the foaming agent composition in an amount less than about 75% by weight, such as in an amount less than about 65% by weight, such as in an amount less than about 55% by weight, such as in an amount less than about 45% by weight, such as in an amount less than about 35% by weight.

The composition may further comprise one or more oil field additives selected from the group comprising corrosion inhibitors, scale inhibitors, emulsifiers, water clarifiers, dispersants, emulsion breakers, hydrogen sulfide scavengers, gas hydrate inhibitors, biocides, pH modifiers, surfactants, synergistic compounds, asphaltene inhibitors, paraffin inhibitors, antioxidants, pour point depressants, viscosity modifiers, flow back aids, friction reducers, or crosslinking agents. Unless otherwise specified, these additives typically are less than 5%, such as less than 2%, such as less than 1% by weight and generally greater than about 0.01% by weight. Such additives can be introduced into the well, wellbore or pipeline before, during or after the introduction of the foaming agent composition, or can be a component of said composition.

Suitable corrosion inhibitors include, but are not limited to, amidoamines, quaternary amines, amides, and phosphate esters.

Suitable scale inhibitors include, but are not limited to, phosphates, phosphate esters, phosphoric acids, phosphonates, phosphonic acids, polyacrylamides, salts of acrylamido-methyl propane sulfonate/acrylic acid copolymer (AMPS/AA), phosphinated maleic copolymer (PHOS/MA), and salts of a polymaleic acid/acrylic acid/acrylamido-methyl propane sulfonate terpolymer (PMA/AMPS).

Suitable emulsifiers include, but are not limited to, salts of carboxylic acids, products of acylation reactions between carboxylic acids or carboxylic anhydrides and amines, and alkyl, acyl and amide derivatives of saccharides (alkyl-saccharide emulsifiers).

Suitable water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, and cationic polymers such as diallyldimethylammonium chloride (DADMAC).

Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate) and the triamine- and tetramine-polymethylene phosphonates with 2-4 methylene groups between each N atom, at least 2 of the numbers of methylene groups in each phosphonate being different. Other suitable dispersion agents include lignin or derivatives of lignin such as lignosulfonate and naphthalene sulfonic acid and derivatives.

Suitable emulsion breakers include, but are not limited to, dodecylbenzylsulfonic acid (DDBSA), the sodium salt of xylene sulfonic acid (NAXSA), epoxylated and propoxylated compounds, anionic cationic and nonionic surfactants, and resins, such as phenolic and epoxide resins.

Examples of hydrogen sulfide scavengers include, but are not limited to, oxidants such as inorganic peroxides such as sodium peroxide, or chlorine dioxide, aldehydes or dialdehydes, such as $C_{1-10}$ aldehydes, formaldehyde, glutaraldehyde, (meth)acrolein or glyocxal), triazines such as monoethanol amine triazine, and monomethylamine triazine and hydantoins such as hydroxyalkylhydantoins, bis(hydroxyalkyl)hydantoins and dialkylhydantoins where the alkyl group is a $C_{1-6}$ alkyl group.

Preferably the hydrogen scavenger is selected from a group comprising glyoxal or bis(hydroxyalkyl)hydantoins.

More preferably the hydrogen sulfide scavenger is 1,3-Bis (hydroxymethyl)-5,5-dimethylhydantoins also known as 1,3-dimethylol-5,5-dimethylhydantion (DMDMH).

Suitable gas hydrate inhibitors include, but are not limited to, thermodynamic inhibitors (THI), kinetic inhibitors (KHI), and anti-agglomerates (AA). Suitable thermodynamic inhibitors include, but are not limited to, NaCl salt, KCl salt, $CaCl_2$ salt, $MgCl_2$ salt, $NaB_2$ salt, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol), methanol, propanol, ethanol, glycol ethers (such as diethyleneglycol monomethyl ether, ethylene glycol monobutyl ether), and alkyl or cyclic esters of alcohols (such as ethyl lactate, butyl lactate, methylethyl benzoate). Suitable kinetic inhibitors and anti-agglomerates include, but are not limited to, polymers and copolymers, polysaccharides (such as hydroxy-ethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

Any biocide suitable in oilfield operations may be used. A biocide may be included in a composition in an amount of about 0.1 ppm to about 1000 ppm on a weight basis. Suitable biocides include, but are not limited to, oxidizing and non-oxidizing biocides. Suitable non-oxidizing biocides include, for example other quaternary ammonium compounds (e.g., quaternary amine compounds and cocodiamine), halogenated compounds (e.g., bronopol and 2-2-dibromo-3-nitrilopropionamide (DBNPA)), sulfur compounds (e.g., carbamates, and metronidazole), and quaternary phosphonium salts (e.g., tetrakis(hydroxymethyl) phosphonium sulfate (THPS)). Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include NaOH, KOH, $Ca(OH)_2$, CaO, $Na_2CO_3$, $KHCO_3$, $K_2CO_3$, $NaHCO_3$, MgO, and $Mg(OH)_2$.

Any antioxidant suitable in oilfield operations may be used. Exemplary antioxidants include but are not limited to sulfites, thiocyanates and thiosulfates. An antioxidant may be included in a composition in an amount of about 1 ppm to about 1000 ppm on a weight basis.

The composition may also comprise one or more additional foaming agents such as an additional anionic surfactant, a cationic surfactant, a nonionic surfactant, an amphoteric surfactant, or a zwitterionic surfactant. Such additives can be introduced into the well, wellbore or pipeline before, during or after the introduction of quaternary organosilane composition.

As described above, the composition of the present disclosure is combined with a liquid in order to cause the liquid to foam. In one embodiment, the liquid is foamed in the presence of other fluids in order to separate the liquid from the other fluids. For instance, in one embodiment, the liquid can be contained in a tubular structure comprising a gas well and the other fluid can comprise natural gas. The amount of the composition added to the liquid can depend upon numerous factors and circumstances. In one embodiment, the composition is added to a liquid in an amount sufficient for the quaternary organosilane to have a concentration of at least about 250 ppm, such as at least about 500 ppm, such as at least about 750 ppm, such as at least about 1000 ppm, such as at least about 1500 ppm, such as at least about 2000 ppm, such as at least about 3000 ppm, such as at least about 4000 ppm. The concentration of the quaternary organosilane in the liquid is generally less than about 10,000 ppm, such as less than about 5000 ppm, such as less than about 3000 ppm on a weight basis.

The present disclosure may be better understood with reference to the following example.

EXAMPLE

A series of tests were conducted to determine the foaming ability and foam stability of four foaming agents when combined with a hydrocarbon liquid. Three of the foaming agents represent various foaming agents that have been used in the past. The conventional foaming agents were compared to a foaming agent in accordance with the present disclosure.

The following example demonstrates the ability of compositions made according to the present disclosure to foam a hydrocarbon particularly kerosene. In this example, a composition containing a quaternary organosilane in accordance with the present disclosure was compared with compositions containing (1) didecyldimethylammonium chloride, (2) a cocamine oxide surfactant, and (3) an alkyl imidazoline surfactant, particularly a coco-substituted imidazoline.

The following test procedure was used. The quaternary organosilane composition and the other foaming agent compositions were added to a one liter graduated cylinder containing 200 mL of kerosene. Nitrogen was sparged into the kerosene in the graduated cylinder via a glass diffusion stone at a rate of 56.6 L/hr (2 SCFH).

The quaternary organosilane composition and the other foaming agents were added to the kerosene at a concentration of between 250 ppm to 1500 ppm on a weight basis using a micropipet.

The foam height represented the mL occupied by the foam after the foam was formed. Foam height was observed for 5 minutes or for the required time in order to meet maximum foam height. The half-life represents the time it takes a foam having an initial foam volume to decay by 50% of that original foam volume, e.g., if the initial foam volume is 500 mL as measured in a 1000 mL graduated cylinder, then the half-life is the time is takes for the foam volume to reduce to a value of 250 mL Foam half-life was measured at the time in which the foam collapsed to half of its original volume. Testing was performed at room temperature 22° C. The materials used in the examples are as follows:

| Material | Description |
|---|---|
| Kerosene | 100% Low odor Kerosene (CAS 64742-47-8) |
| Sample No. 1 | 72% 3-(trimethoxysilyl) propyldimethyloctadecyl ammonium chloride (CAS 27668-52-6) and 28% methanol |
| Sample No. 2 | 80% Didecyldimethylammonium chloride (CAS 7173-51-5), 10% water and 10% ethanol |
| Sample No. 3 | N-alkyl($C_{12}$-$C_{16}$) dimethylamine oxide containing primarily cocamine oxide sold as Barlox ® 12 by Lonza, Inc. |
| Sample No. 4 | Coco-substituted imidazoline sold as Amphoterge ® K-2 by Lonza, Inc. |

Sample No. 1 above is a milky liquid with 72% active. A 10% stock solution was used to dose the material into the kerosene at the desired concentration. The 10% stock solution was produced by combining 10% of Sample No. 1 by weight with 90% by weight kerosene. Sample No. 1 was observed to dissolve fully to form a 10% solution in kerosene. Sample No. 2 is known to have solubility in kerosene of less than 1000 ppm. Sample No. 2 was dosed directly to the foam cell kerosene sample. Sample Nos. 2 and 3 were also formed into 10% by weight stock solutions in kerosene prior to being added to the foam cell kerosene samples at the desired concentrations. The following results were obtained:

| Material | A.I. Dosage | Max Foam at Time | Foam Height | Foam Half-Life | Observation |
|---|---|---|---|---|---|
| Kerosene Alone | — | 5 min | 20 mL | <2 sec | Fast breaking foam |
| Sample No. 1 | 250 ppm | 5 min | 15 mL | <2 sec | Precipitation observed after sitting over night |
|  | 500 ppm | 2 min | 80 mL | <2 sec |  |
|  |  | 5 min | 30 mL |  |  |
|  | 750 ppm | 1.5 min | 755 mL | <5 sec |  |
|  |  | 2.5 min | 280 mL |  |  |
|  |  | 5 min | 80 mL |  |  |
|  | 1000 ppm | 1.5 min | 880 mL | 60 sec |  |
|  |  | 2.5 min | 480 mL |  |  |
|  |  | 5 min | 230 mL |  |  |
|  | 1500 ppm | 1.5 min | 980 mL (max) | 90 sec |  |
| Sample No. 2 | 250 ppm | 5 min | 25 mL | <2 sec | Slightly Hazy solution after sitting overnight |
|  | 500 ppm | 5 min | 25 mL |  |  |
|  | 750 ppm | 5 min | 20 mL |  |  |
|  | 1000 ppm | 5 min | 20 mL |  |  |
|  | 1500 ppm | 5 min | 25 mL |  |  |
| Sample No. 3 | 0 ppm | 5 min | 10 mL | <2 sec | Fast breaking foam |
|  | 250 ppm | 5 min | 10 mL | <2 sec |  |
|  | 500 ppm | 5 min | 10 mL | <2 sec |  |
|  | 750 ppm | 5 min | 10 mL | <2 sec |  |
|  | 1000 ppm | 5 min | 10 mL | <2 sec |  |
|  | 1500 ppm | 5 min | 10 mL | <2 sec |  |
| Sample No. 4 | 0 ppm | 5 min | 10 mL | <2 sec | Fast breaking foam |
|  | 250 ppm | 5 min | 10 mL | <2 sec |  |
|  | 500 ppm | 5 min | 10 mL | <2 sec |  |
|  | 750 ppm | 5 min | 10 mL | <2 sec |  |
|  | 1000 ppm | 5 min | 10 mL | <2 sec |  |
|  | 1500 ppm | 5 min | 10 mL | <2 sec |  |

Sample No. 1 appeared to be a self-dispersing composition in kerosene in high concentrations. At 1500 ppm, the treated kerosene was observed to contain a precipitate after sitting over night.

Although Sample No. 1 and Sample No. 2 are both quaternary ammonium compounds, Sample No. 1 shows significantly higher foaming performance in kerosene. Sample No. 1 had high foaming potential when dosed at 750 to 1500 ppm in kerosene. The maximum foam height was reached early (particularly at 1.5 minutes). In addition, the foam of Sample No. 1 dispersed relatively quickly having a foam half-life of 60 seconds at 1000 ppm and having a foam half-life of 90 seconds at 1500 ppm. This result is particularly advantageous. For example, when combined with a hydrocarbon liquid in an oil or gas well, the foaming agent of the present disclosure will rapidly form a foam, allow the foamed hydrocarbon liquid to reach the surface, and then the foam will rapidly disperse leaving a hydrocarbon liquid product that can be easily handled and processed.

In contrast, all of the other foaming agents (Sample No. 2, Sample No. 3, and Sample No. 4) were not capable of forming any substantial amounts of foam when combined with the kerosene under the test conditions. Although the foaming agents of Sample No. 2, Sample No. 3, and Sample No. 4 are capable of forming a foam when combined with water, the foaming agents are not suited for foaming hydrocarbon liquids.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged either in whole or in part. Furthermore, those of ordinary skill in the art will appreciate that the foregoing description is by way of example only, and is not intended to limit the invention so further described in such appended claims.

What is claimed:

1. A method for removing a liquid from a subterranean well, comprising:
    adding a composition to the liquid contained in the subterranean well, the composition comprising a quaternary organosilane foaming agent, the liquid comprising one or more hydrocarbons in an amount of at least 40% by weight of the liquid,
    combining the composition containing the quaternary organosilane foaming agent with the liquid in a manner that forms a foamed liquid within the subterranean well, wherein the foamed liquid contains the composition containing the quaternary organosilane foaming agent; and
    removing the foamed liquid containing the composition containing the quaternary organosilane foaming agent from the subterranean well.

2. The method as defined in claim 1, wherein the subterranean well comprises a gas well or oil well.

3. The method as defined in claim 1, wherein removing the foamed liquid from the subterranean well comprises bringing the foamed liquid to a surface of the subterranean well by applying a gas pressure to the foamed liquid in the subterranean well.

4. The method as defined in claim 1, wherein the liquid contained in the subterranean well comprises one or more hydrocarbons in an amount greater than about 60% by weight of the liquid.

5. The method as defined in claim 1, wherein the quaternary organosilane foaming agent comprises a halide salt of a quaternary ammonium silane.

6. The method as defined in claim 1, wherein the quaternary organosilane foaming agent comprises $$Y^1Y^2Y^3Si\text{-}A\text{-}Q^+R^1R^2R^3X^- \qquad (I)$$

wherein:
    $Y^1, Y^2, Y^3$ represent independently from one another R or RO, wherein each R represents independently from each other a $C_{1\text{-}4}$ alkyl group;
    A represents a $C_{1\text{-}4}$ alkanediyl or a $C_{2\text{-}4}$ alkenediyl group;
    Q represents a nitrogen or phosphorous atom;

$R^1$, $R^2$, $R^3$ represent independently from one another a $C_{1-28}$ alkyl group, wherein at least one of $R^1$, $R^2$, or $R^3$ comprises an alkyl group having at least eight carbon atoms; and X represents chloride, bromide, fluoride, iodide, acetate or tosylate.

7. The method as defined in claim 1, wherein the quaternary organosilane foaming agent comprises

 (II)

wherein:
each R represents independently from one another a $C_{1-4}$ alkyl group;
A represents a $C_{1-4}$ alkanediyl or a $C_{2-4}$ alkenediyl group;
Q represents a nitrogen or phosphorous atom;
$R^1$, $R^2$, $R^3$ represent independently from one another a $C_{1-28}$ alkyl group, wherein at least one of $R^1$, $R^2$, or $R^3$ comprises an alkyl group having at least eight carbon atoms; and
$X^-$ represents chloride, bromide, fluoride, iodide, acetate or tosylate.

8. The method as defined in claim 1, wherein the quaternary organosilane foaming agent comprises 3-(trimethoxysilyl) propyldimethyloctadecyl ammonium chloride.

9. The method as defined in claim 1, wherein the subterranean well has a reservoir gas pressure, and wherein the foamed liquid is removed from the subterranean well by the reservoir gas pressure.

10. The method as defined in claim 1, wherein the composition further comprises a non-aqueous solvent combined with the quaternary organosilane foaming agent.

11. The method as defined in claim 10, wherein the non-aqueous solvent comprises an alcohol, a benzene derivative, a ketone, an ester based solvent, or a polar acetate.

12. The method as defined in claim 10, wherein the non-aqueous solvent is present in the composition in an amount of from about 25% to about 75% by weight of the composition, and wherein the quaternary organosilane foaming agent is present in the composition in an amount of from about 25% to about 75% by weight of the composition.

13. The method as defined in claim 1, wherein the composition further comprises a corrosion inhibitor, a scale inhibitor, or a hydrogen sulfide scavenger, or mixtures thereof.

14. The method as defined in claim 13, wherein the composition further comprises a hydrogen sulfide scavenger, the hydrogen sulfide scavenger comprising a glyoxal or comprises 1,3-dimethylol-5,5-dimethylhydantion.

15. The method as defined in claim 1, wherein the composition is added to the liquid contained in the subterranean well in an amount such that a concentration of the quaternary organosilane foaming agent within a resulting mixture is from about 250 ppm to about 5000 ppm.

16. The method as defined in claim 1, wherein the composition produces a foam within the subterranean well, the foam having a half-life of less than about 180 seconds.

17. The method as defined in claim 1, further comprising separating a hydrocarbon liquid from the foamed liquid.

18. The method as defined in claim 1, wherein the quaternary organosilane foaming agent comprises non-polymeric quaternary organosilane.

19. The method as defined in claim 18, wherein the non-polymeric quaternary organosilane has a molecular weight of less than about 900.

* * * * *